United States Patent [19]

Mayerjak et al.

[11] Patent Number: 5,223,986
[45] Date of Patent: Jun. 29, 1993

[54] RADIATION PROJECTING DEVICE

[75] Inventors: Robert Mayerjak, Torrington; George Schafer, Somers, both of Conn.

[73] Assignee: Kaman Aerospace Corporation, Bloomfield, Conn.

[21] Appl. No.: 565,807

[22] Filed: Aug. 9, 1990

[51] Int. Cl.⁵ .............................................. G02B 5/00
[52] U.S. Cl. .................................. 359/894; 385/119; 353/122; 350/96.31
[58] Field of Search ................ 359/894, 652, 900, 798, 359/799, 800, 808, 512, 514; 353/122, 1; 358/95, 211; 385/119

[56] References Cited

U.S. PATENT DOCUMENTS

| | | | |
|---|---|---|---|
| 2,558,492 | 6/1951 | Lely et al. | 359/894 |
| 3,257,507 | 6/1966 | Borberg et al. | 359/894 |
| 3,558,220 | 1/1971 | Werner | 359/894 |
| 3,801,181 | 4/1974 | Kitano et al. | 385/116 |
| 3,832,028 | 8/1974 | Kapron | 385/119 |
| 4,725,135 | 2/1988 | Browning | 353/122 |
| 4,862,257 | 8/1989 | Ulich | 358/95 |

*Primary Examiner*—Paul M. Dzierzynski
*Assistant Examiner*—Loha Ben
*Attorney, Agent, or Firm*—Fishman, Dionne & Cantor

[57] ABSTRACT

A device is provided for expanding, reshaping, modifying the intensity distribution and projecting a beam of radiation such as light. The present invention comprises a four sided, internally mirrored tube of polygonal (i.e., rectangular) cross-section wherein the cross-sectional area of the tube expands (generally linearly) with respect to tube length from a first end to a second end. The first end of the tube is associated with a plano-concave (or equivalent) lens and the second end of the tube is associated with a generally flat pane exit optic which includes optical edging for refracting perimeter rays back into the desired field of view. A practical application for the present invention is laser photogrammetry wherein typically it is desired (1) to expand a laser beam of circular cross-section, (2) to reshape the beam into a desired cross-section, usually rectangular, and (3) to project the reshaped beam upon a distant surface.

11 Claims, 2 Drawing Sheets

RADIATION PROJECTING DEVICE

BACKGROUND OF THE INVENTION

This invention relates generally to a device for projecting and reshaping a beam of radiation. More particularly, this invention relates to a device for expanding a radiation (i.e., laser) beam, reshaping the beam into a desired cross-section (i.e., circular to rectangular), modifying the intensity distribution and projecting the reshaped beam onto a distant surface.

There is currently a need for discrete devices which expand, reshape and project beams of radiation. An example of an application which may require such a device is the imaging lidar system disclosed in U.S. Pat. No. 4,862,257 wherein a pulsed light source (laser) projects typically circular pulses of light at a target in a backscattering medium with the reflected light pulses being detected by one or more gated cameras. In certain situations, it may be advantageous to reshape the pulsed light from the original circular cross-sectional shape to another configuration, generally rectangular or square. This need is particularly important in the imaging lidar system described in U.S. patent application Ser. No. 565,631 filed contemporaneously herewith, entitled "Imaging Lidar System" and invented by Charles H. Kaman, Bobby L. Ulich, Robert Mayerjak and George Schafer Attorney Docket No. 90-1321. Presently, it is difficult to effectively and accurately expand, reshape and project radiation beams such as laser beams; and no single, discrete device is presently known which executes this type of beam modification.

SUMMARY OF THE INVENTION

The above-discussed and other deficiencies and drawbacks of the prior art are overcome or alleviated by the radiation projecting device of the present invention. In accordance with the present invention, a device is provided for expanding, reshaping, modifying the intensity distribution and projecting a beam of radiation such as light. The present invention comprises a four sided, internally mirrored tube or horn of polygonal (i.e., rectangular) cross-section wherein the cross-sectional area of the tube expands (generally linearly) with respect to tube length from a first end to a second end. The first end of the tube is associated with a plano-concave (or equivalent) lens and the second end of the tube is associated with a generally flat pane exit optic which includes optical means for refracting perimeter rays back into the desired field of view.

A practical application for the present invention is laser photogrammetry wherein typically it is desired (1) to expand a laser beam of circular cross-section, (2) to reshape the beam into a desired cross-section, usually rectangular, and (3) to project the reshaped beam upon a distant surface. An important advantage of this invention is that the beam can be projected to a variety of distances with little degradation from the effects of shaping, that the shaping can be used to increase the uniformity of the beam, and that it can be compact, lightweight and inexpensive.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
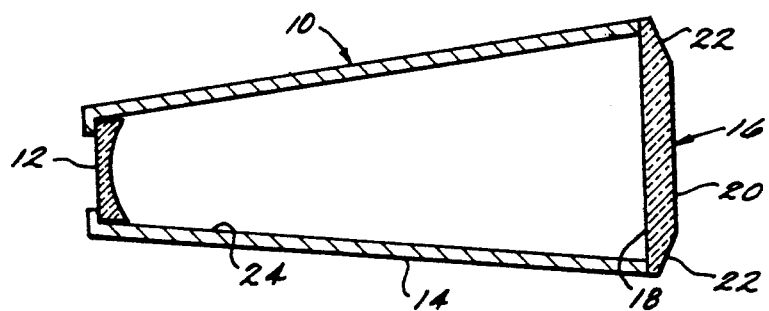
FIG. 1 is a cross-sectional elevation view of a radiation projecting device in accordance with the present invention.

Referring first to FIG. 1, a preferred embodiment of the radiation projecting device of the present invention is shown generally at 10. Device 10 comprises a plano-concave lens 12, (or its equivalent such as a concave/-concave lens), that over expands the entering beam relative to its final condition. Lens 12 is positioned on one end of an internally mirrored tube 14 of rectangular cross-section that expands generally linearly with length and which terminates at an exit optic 16. (It will be appreciated that the tube cross-section could be of some other desired polygonal shape so that a circular entrance beam will be transformed to that other desired polygonal shape). Exit optic 16 has generally flat inner and outer panes 18, 20 respectively, with shaped edges 22 around the perimeter of outer pane 20 that refract rays (that would otherwise be lost) back into the desired field. Shaped edges 22 may be flat or curved bevel edges. In this preferred embodiment, the entrance optic 12 and the exit optic 16 also serve as seals to protect the mirrors 24 of tube 14 from contamination. Preferably, the interior of tube 10 is at a vacuum or has a moisture-free atmosphere provided by a suitable inert gas such as nitrogen. In an alternate configuration, exit optic 16 can be omitted, and the light that is lost by its omission can be made small by making the tube longer than the preferred configuration. Similarly, the entrance optic 12 may be omitted in the event that the entering beam has already been expanded.

Figure 2:
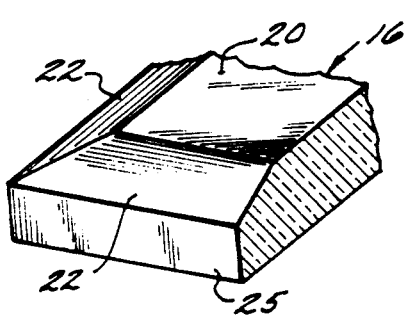
FIG. 2 is an enlarged perspective view of a corner portion of the radiation projecting device of FIG. 1.

FIG. 2 depicts a corner detail of exit optic element 16 wherein bottom pane 18 terminates at four transverse side edges 25; and a beveled or ramped edge 22 extends between each side edge 25 and upper pane 16. The FIG. 2 end optic configuration has the advantage of simplicity and low cost. However, the FIG. 2 corner detail can permit a pair of small triangles of radiation at each corner to escape projection into the desired rectangularly shaped beam.

Figure 3:
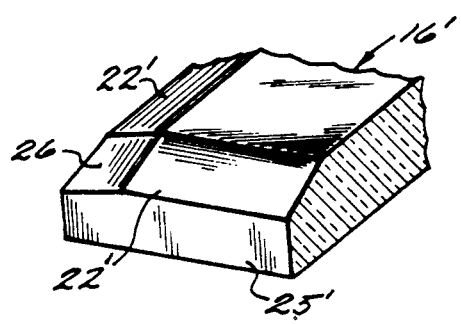
FIG. 3 is an enlarged perspective view, similar to FIG. 2, depicting an alternative embodiment of a corner portion.

FIG. 3 shows a preferred (relative to FIG. 2) corner embodiment that includes one or more facets 26 at each corner. The facets 26 redirect the radiation that would otherwise be lost at each corner into the desired rectangularly shaped beam.

Figure 4:
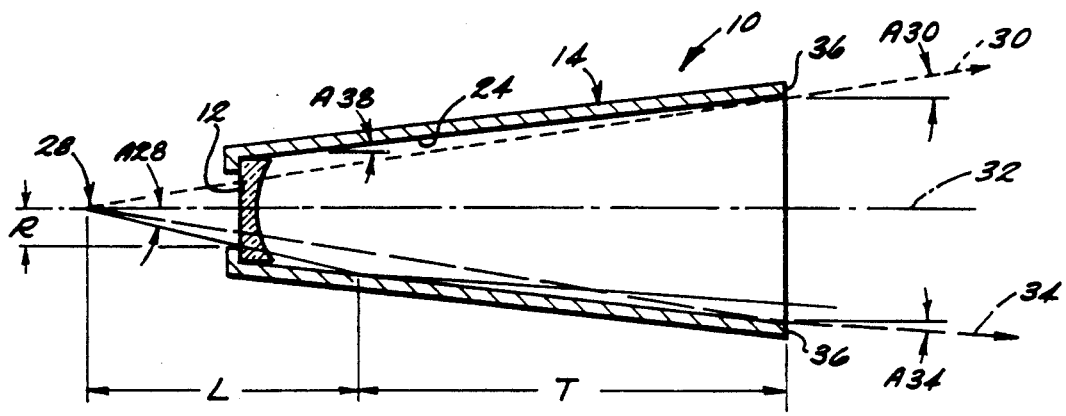
FIG. 4 is a diagrammatic view depicting the operation of the radiation projecting device of FIG. 1.

The principal of operation for the radiation projection device of the present invention is described in the example of FIG. 4 which shows the cross-section of the device before the addition of an exit optic. Turning now to FIG. 4, consider parallel rays (such as from a laser) entering from the left of FIG. 4. The entrance optic 12 expands the rays producing a virtual origin 28 for the rays. Ray 30 just clears the rectangular tube 14 with no reflection and leaves device 10 at an angle A30 relative to the center axis 32. Ray 34 just strikes the end 36 of tube 14 and is reflected leaving the device at an angle A34 relative to the center axis. The taper angle A38 of the tube 14 and the maximum expansion angle A28 are selected so that all reflected rays leave the device at an angle less than A34.

Figure 5:
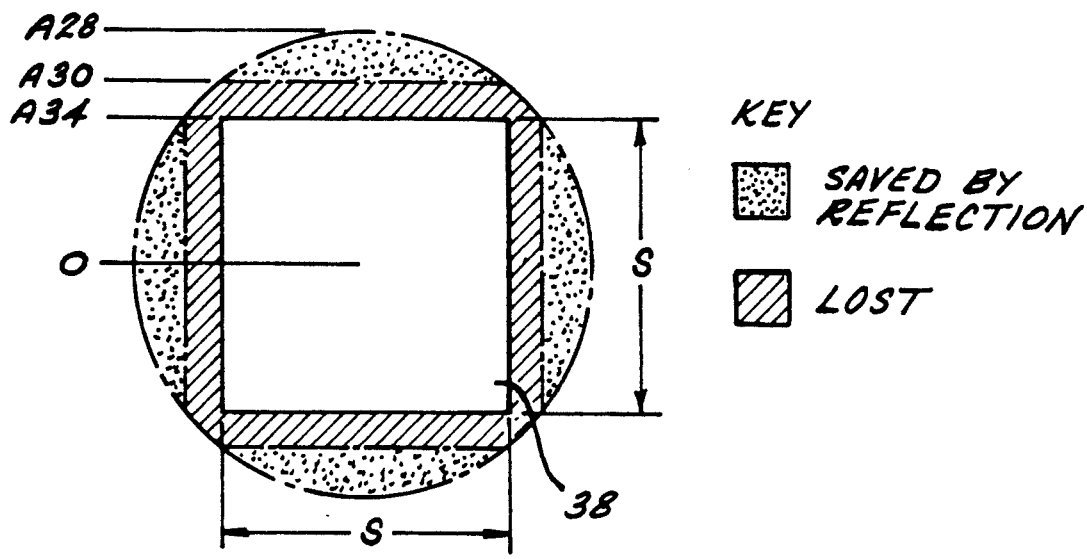
FIG. 5 is diagram of a beam projected through the projecting device of FIG. 4.

FIG. 5 shows approximately the form of the beam 38 of size S×S projected by the device of FIG. 4. If an exit optic 16 as shown in FIG. 1 is added to the device, the rays between angles A30 and A34 can be refracted into the desired projected beam 38. The user controls the position of such refracted rays in the projected beam by selection of the shape for regions 22 and 26 shown in FIGS. 1, 2 and 3. Such rays can be refracted principally into the edges of the beam thereby increasing the uniformity of a beam which otherwise would be dim at the edges, such as a laser beam of Gaussian distribution.

Referring again to FIG. 4, the following numerical example identifies the dimensions (L=4.767 inches, T=12.000 inches, and A38=2.792 degrees) for a projector device in accordance with this invention that receives a circular beam of parallel light of radius R=0.300 inches, expands the beam to a circular beam of an angle A28=3.800 degrees, and projects a square beam of angle A34=2.505 degrees. From the law of reflection, A30=3.079 degrees. It will be appreciated that this combination of dimensions is for example only; and other combinations of dimensions may be found that may be more suitable for a specific application.

Figure 6:
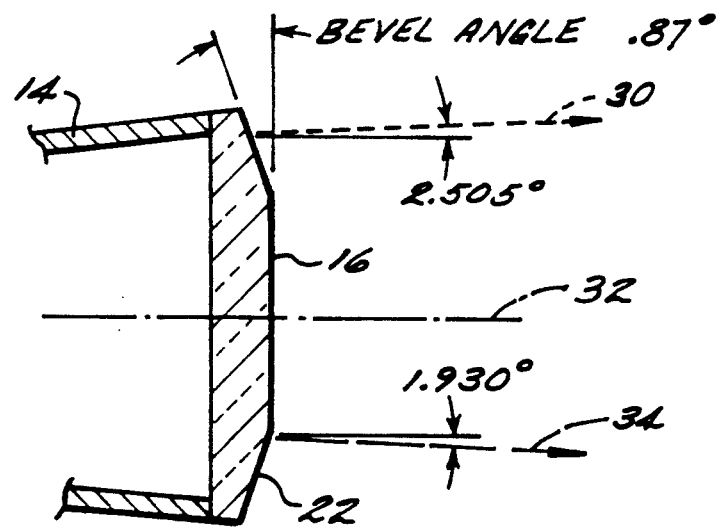
FIG. 6 is cross sectional elevation view through the end optic of the device of FIG. 1, depicting an operational example.

FIG. 6 shows an exit optic 16 constructed from a glass with an index of refraction, n=1.66, that redirects the rays between angles A34 and A30 into the edge regions of the desired square beam. It will be appreciated that when an exit optic is used, the final angle of the projected beam may be reduced to less than A34.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for projecting a beam of radiation comprising:

tube means having a plurality of sides and having a polygonal cross-section with respect to the length of said tube means, said polygonal cross-section increasing between a first end of said tube means and a second end of said tube means at a preselected angle wherein a beam of radiation having a circular cross-section entering said first end is substantially transformed to a beam of radiation having said polygonal cross-section exiting said second end; and mirror means on an interior surface of said tube means.

2. The device of claim 1, including:

entrance optic means in said first end of said tube means, said entrance optic means expanding a beam of radiation entering said tube means.

3. The device of claim 2, wherein:

said entrance optic means comprises a plano-concave or concave-concave lens.

4. The device of claim 1, including:

exit optic means in said second end of said tube means, said exit optic means including refractive means for refracting radiation back towards a preselected field of view corresponding to said polygonal cross-section.

5. The device of claim 4, wherein:

said refractive means comprises beveled edges extending from each side of said polygonal cross-section.

6. The device of claim 5, wherein adjoining pairs of said beveled edges terminate at a corner and including:

a facet formed in said corner.

7. The device of claim 1, wherein said tube means is sealed by a sealing means defining an internal cavity and including:

a moisture free environment in said cavity.

8. The device of claim 1, wherein:

said polygonal cross-section comprises a rectangle or a square.

9. The device of claim 1, wherein:

said polygonal cross-section increases at a linear rate.

10. A method for projecting a beam of light comprising the steps of:

(1) expanding a beam of light of circular cross-section;

(2) transforming said beam of circular cross-section to a beam of polygonal cross-section; and (3) refracting light rays passing outside the perimeter of said polygonal cross-section back to within said polygonal cross-section.

11. The method of claim 10, wherein:

said polygonal cross-section comprises a rectangle or square.

* * * * *